(12) United States Patent
D'Agostino

(10) Patent No.: US 8,590,269 B2
(45) Date of Patent: *Nov. 26, 2013

(54) EASILY REPLACEABLE CERAMIC TILE FLOOR

(76) Inventor: Joseph D. D'Agostino, Grand Island, NY (US)

(*) Notice: Subject to any disclaimer, the term of this patent is extended or adjusted under 35 U.S.C. 154(b) by 233 days.

This patent is subject to a terminal disclaimer.

(21) Appl. No.: 13/004,329

(22) Filed: Jan. 11, 2011

(65) Prior Publication Data

US 2011/0305908 A1    Dec. 15, 2011

Related U.S. Application Data

(63) Continuation-in-part of application No. 12/815,633, filed on Jun. 15, 2010.

(51) Int. Cl.
*E04B 1/00* (2006.01)

(52) U.S. Cl.
USPC .............. 52/747.11; 52/309.3; 52/309.17; 52/309.12

(58) Field of Classification Search
USPC ........ 52/309.3, 177, 384, 385, 403.1; 156/63, 156/81, 297, 299
See application file for complete search history.

(56) References Cited

U.S. PATENT DOCUMENTS

| | | | | |
|---|---|---|---|---|
| 1,796,272 A * | 3/1931 | Stanbrough | ................... | 52/385 |
| 2,672,793 A * | 3/1954 | Rowe et al. | ................... | 404/31 |
| 5,116,439 A * | 5/1992 | Raus | ................... | 156/71 |
| 5,518,799 A * | 5/1996 | Finestone et al. | ............ | 428/137 |
| 6,630,041 B1 * | 10/2003 | Reiber | ................... | 156/71 |
| 7,183,338 B1 | 2/2007 | Warren | | |
| 2011/0302855 A1 | 12/2011 | D'Agostino | | |
| 2012/0279655 A1 | 11/2012 | D'Agostino | | |

* cited by examiner

*Primary Examiner* — William Gilbert
*Assistant Examiner* — Patrick Maestri
(74) *Attorney, Agent, or Firm* — James C. Simmons

(57) ABSTRACT

An article for applying to a floor substrate for preparing the floor substrate for laying of ceramic tiles by bonding ceramic tiles to the article. The article comprises a backer board having a lower surface for application to a floor substrate and an upper surface, a sheet, and a releasable adhesive bonding the sheet to the upper surface of the backer board. The sheet covers the entirety of the upper surface of the backer board. After the article is applied to the floor substrate, ceramic tiles are then bonded to the sheet. For replacement of the ceramic floor, the releasable adhesive allows the sheet with the ceramic tiles attached to be easily removable from the backer board. A method for laying ceramic tiles comprising laying at least one sheet on a floor substrate so that it floats on the floor substrate, and bonding a plurality of ceramic tiles to the at least one sheet.

15 Claims, 6 Drawing Sheets

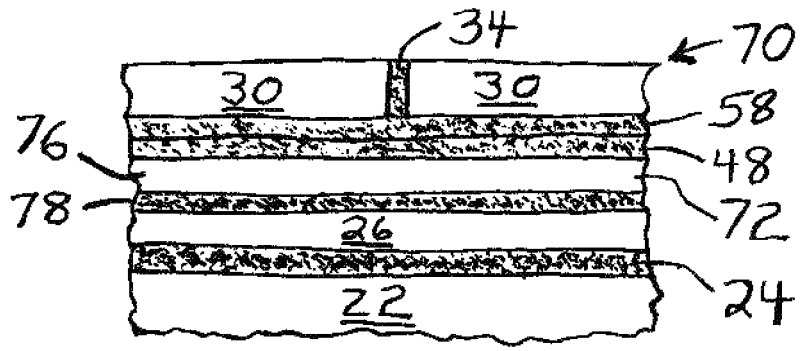
FIG. 8
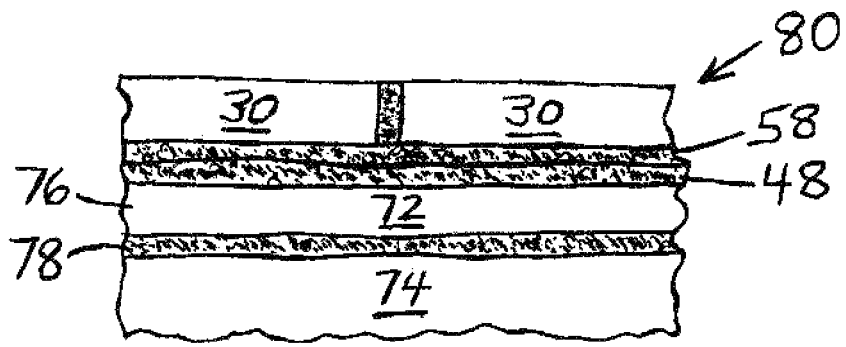
FIG. 9
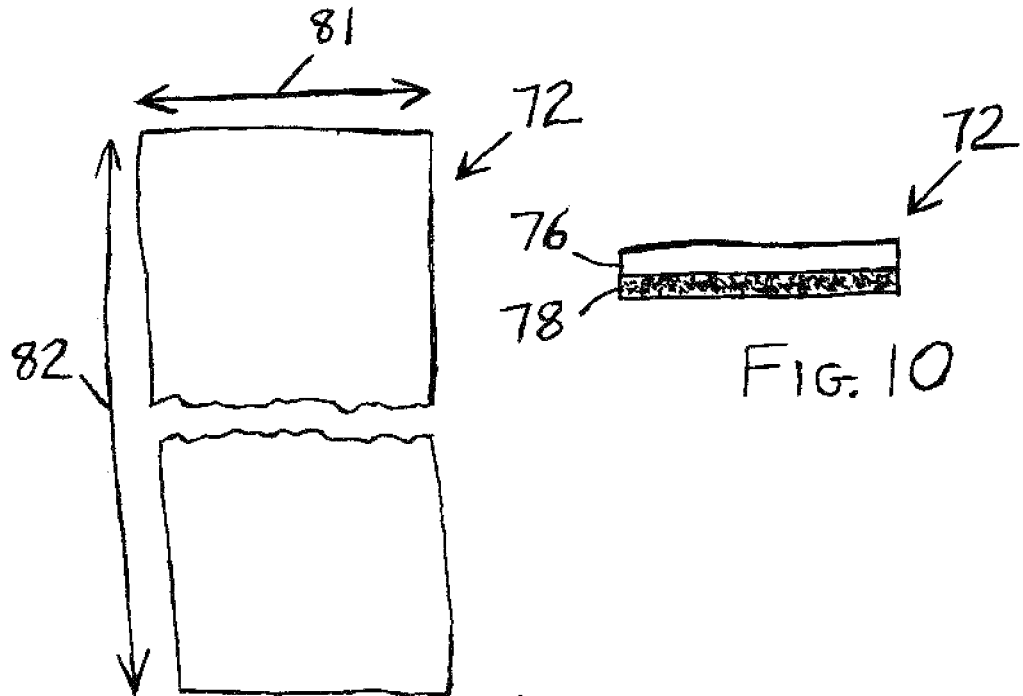
FIG. 10
FIG. 11

EASILY REPLACEABLE CERAMIC TILE FLOOR

This is a continuation-in-part of application Ser. No. 12/815,633, filed Jun. 15, 2010, which is hereby incorporated herein by reference.

The present invention is related generally to flooring. More particularly, the present invention is related to ceramic tile flooring.

In order to have sufficient strength to accept ceramic tile, an underlying floor may need to be built-up. For example, it may be necessary to add backer board or a second layer of plywood to a plywood floor. A backer board is a strong dense board (typically 3×5 or 4×4 or 4×5 feet and typically ¼ to ½ inch thick) typically laid on and bonded with conventional latex-modified thinset mortar and attached by screws, nails, or other fasteners to a wood floor to add strength thereto and to support tile so that it doesn't crack. By "latex-modified" is meant the addition of latex or other suitable polymers, in a manner in accordance with principles commonly known to those of ordinary skill in the art to which the present invention pertains, to the thinset mortar to increase its bonding strength. Backer board may be composed of cement, dense wood, gypsum material faced with fiberglass, or other suitable material providing the necessary strength and rigidity. A concrete floor is considered to normally have sufficient strength and rigidity that it does not normally require backer board to be applied thereto. When applied to a floor or floor substrate, unless otherwise specified, a backer board is considered herein to be part of the floor or floor substrate.

A tile is a thin (for example, ⅛ to ½ inch thick) usually rectangular or square (for example, 1-foot square) typically decorative member used to cover floors, the tiles abutting each other across the surface of the covered or tiled floor. Two common types of tile commonly used for flooring may be classified as vinyl and ceramic. As used herein and in the claims, the term "ceramic tile" is intended to include tile made of fired clay, brick, concrete, porcelain, marble, travertine, and other stone or slate, and does not include vinyl tile.

Vinyl tiles are sufficiently flexible and have enough "give" that they do not need the extra strength and rigidity afforded by backer boards and therefore can be laid directly on a wood floor.

In a typical laying of a floor, ceramic tiles have been permanently bonded to the concrete, wood, or backer board substrate, and such a tiled floor is considered satisfactory for use. When it is desired to replace the tiles either to selectively replace certain tiles or for re-decorating purposes or otherwise, difficulties are experienced. Removal of tiles off concrete is considered to be difficult (may need a jack hammer or the like), and removal off backer board or wood may damage the backer board or the wood floor.

The attachment of backer board to a hardwood floor for strengthening thereof so that it may accept ceramic tiles may damage the hardwood floor.

Solutions have been proposed for easily removing floor coverings attached to a floor. For example, for carpet, U.S. Pat. No. 5,116,439 discloses a two-component release web secured between a carpet (or other floor covering) and a floor. The web is formed as a laminate of a solid flexible carded fiber membrane to which a solid flexible non-woven spun-bonded fiber membrane is adhered, one membrane being adhered to the carpet during manufacture and the other membrane being glued to the floor during installation. It is further stated that the carpet may be peeled from the floor leaving one membrane secured to the carpet and the other membrane secured to the floor, thus permitting reuse of the carpet in another location and permitting ready installation of a new carpet over the membrane secured to the floor.

This U.S. Pat. No. 5,116,439 also discusses an adhesive carpet installation system which uses a carpet cushion with a "fuzzy" fibrous material bonded to one surface of the cushion. The cushion is glued to the floor surface with the "fuzzy" surface down through use of a pressure sensitive adhesive. The carpet itself is then glued to the upper surface of the cushion using the same pressure sensitive adhesive used to secure the cushion to the floor. It is said that this renders the carpet system totally releasable.

Other U.S. patents/published applications which may be of interest to the present application include Re. 34,357; U.S. Pat. Nos. 3,364,058; 3,765,972; 4,698,249; 5,188,874; 5,501,895; 5,578,363; 6,413,335; 6,630,041; 6,698,149; 6,854,241; 7,183,338; 7,194,843; 7,488,523; 7,520,948; 7,536,835; 7,543,417; 2005/0183370; 2005/0223664; 2007/0151184; and 2009/0218030. All of these U.S. patents/published applications and any others disclosed herein are hereby incorporated herein by reference.

Published patent application 2007/0151184 discloses an easy to install and remove tile system for tiles, particularly resilient tiles, such as vinyl, wherein the tiles are adhered to a high modulus high tear strength liner, such as a rigid vinyl film, which is caused to float on (not attached) or is adhered to the substrate. The adhesive adhering the tile to the liner may be adhesive dots applied to each corner of the tile, pressure-sensitive adhesive, or a spray adhesive. Other examples of what might be called a "loose-lay" process are disclosed in the aforesaid U.S. patents/published application Re. 34,357; U.S. Pat. Nos. 5,188,874; 5,578,363; and 2005/0223664.

Published patent application 2009/0218030 discloses a flooring underlayment membrane bonded to a concrete or wood substrate with thinset mortar (or loose-laid) and tile or stone or slate or other rigid floor covering bonded thereto with thinset mortar. The underlayment membrane comprises two nonwoven fiber mats bonded together with an extrudable thermoplastic resin to provide a combined waterproof membrane and crack isolation membrane.

Congoleum of Mercerville, N.J., markets a 6 feet wide membrane known as an Underfloor membrane which comprises a combination of fibrous felt and pvc (polyvinylchloride) vinyl, and Mannington of Salem, N.J., markets a 6 feet wide membrane known as a mul membrane ("mul" is also a fibrous felt and pvc vinyl combination) wherein the membranes are loosely laid for application of vinyl tiles bonded thereto. Vinyl tiles are sufficiently flexible that they would not normally be expected to experience the difficult cracking and breaking problems that rigid ceramic tiles would experience when laid loosely.

Avaire Floors (having a world wide web address of www.avairefloors.com and whose parent is believed to be called SnapStone) provides a loose lay system which includes porcelain or stone tiles permanently bonded to a plastic grid with a rubberized base. The plastic grids have interlocking tabs which allow them to be clicked together so that they do not move. It is believed that these tiles are grouted with the flexible grout disclosed in the aforesaid U.S. Pat. No. 7,183, 338. Such plastic grid tiles are undesirably thicker so there is more transition to overcome when one goes from one room to another. Also, such plastic grid tiles undesirably do not allow the laying of conventional ceramic tiles, i.e., ceramic tiles without such plastic grids attached.

U.S. Pat. No. 7,520,948 discloses a non-woven fabric which may comprise a synthetic polymer and which is adhered to a floor using an adhesive, and a cementitious bondant (i.e., a skimcoat of thinset mortar) is applied to the fabric, either before or after adhering it to the surface of the floor. A covering in the form of ceramic tile, stone, brick, porcelain, marble, slate, etc. is thereafter bound to the bondant. It is stated that the bondant can be any suitable adhesive, mortar, or other composition or any combination of such substances suitable for fixing the covering to the fabric. The adhesive can be a contact cement or self-stick adhesive faced by a removable waxed paper. It is discussed therein that the non-woven fabric can aid removal of the covering (i.e., tile) at a time following its installation. Examples of non-woven fabrics are said to include randomly-entangled fibrous sheets, chemically-bonded fibrous sheets, thermally-bonded fibrous sheets, and others known in the art. The adhesive may be a contact cement, and the non-woven fabric (underlayer) can have an adhesive (e.g., a self-stick adhesive faced by a removable waxed paper) disposed on the face opposite the bondant. The tile is bound to the fabric by way of a thinset mortar or adhesive set atop a cementitious bondant applied to the fabric. U.S. Pat. No. 7,520,948 suggests that the cohesive strength of the fabric is such that it should tear internally to aid removal of the covering (i.e., ceramic tile or the like) at a time following its installation. It is further stated that in situations in which reversibility of fabric installation is desirable, it is preferable that the adhesive bind the fabric to the surface with little more tenacity than required for stable installation of the fabric and covering and that in a situation such as a ceramic tile floor in which significant stresses, wear, and tear are anticipated, the adhesive must bind the fabric to the surface with sufficient tenacity and stability that the fabric will not significantly separate from the surface under the conditions of normal use.

The above U.S. Pat. No. 7,520,948 importantly does not disclose whether the floor to which the non-woven fabric is adhered is a concrete floor, a wood floor on which backer board has been laid, a hardwood floor, or otherwise. Moreover, U.S. Pat. No. 7,520,948 discusses in very broad and general terms non-woven fabrics and adhesives for application to floors generally without any suggestions as to what items or combination of particular items might be suitable for one type of floor (substrate) and what might be suitable for another type of floor (substrate).

A contact cement or self-stick adhesive is commonly understood to be an adhesive or cement which is sticky (tacky) without any heat or solvent for activation and adheres with light pressure. Such an adhesive may be of a type which forms a permanent or non-removable bond so that the bonded item is not readily removable from the substrate. By suggesting that the non-woven fabric should tear internally to aid removal of the covering, the above U.S. Pat. No. 7,520,948 implies that the adhesive is of a type that permanently bonds the fabric to the floor. Such a product would however undesirably damage a hardwood floor to which the fabric is permanently bonded.

It is accordingly an object of the present invention to prepare a floor so that ceramic tiles may be laid thereon such that they are quickly and easily removable and replaceable at a future date.

It is another object of the present invention to provide a pre-fabricated article for use in easily and quickly preparing the floor to lay the ceramic tiles.

In order to achieve the above articles, an article is provided which comprises a backer board having a lower surface for application to a floor substrate and an upper surface, a sheet, and a releasable adhesive bonding the sheet to the upper surface of the backer board. The sheet covers the entirety of the upper surface of the backer board. Once the article is attached to the floor, the ceramic tiles are bonded to the sheet, whereby the releasable adhesive allows the tiles to be easily and quickly removed for replacement by peeling the sheet from the backer board. The pre-fabrication of the article allows the preparation on-site to be easier and quicker.

In order to prepare a floor so that ceramic tiles may be laid thereon such that they are quickly and easily removable and replaceable at a future date, in accordance with the present invention, at least one sheet is laid on a floor substrate so that it floats on the floor substrate, and a plurality of ceramic tiles are bonded to the at least one sheet.

The above and other objects, features, and advantages of the present invention will be apparent in the following detailed description of the preferred embodiments thereof when read in conjunction with the appended drawings in which the same reference numerals depict the same or similar parts throughout the several views.

BRIEF DESCRIPTION OF THE DRAWINGS

FIG. 8 is a view similar to that of FIG. 1A of a portion of flooring in accordance with another embodiment of the present invention, wherein the flooring substrate includes backer board.

FIG. 9 is a view similar to that of FIG. 1A of a portion of flooring in accordance with the another embodiment of the present invention, wherein the flooring substrate is concrete and does not include backer board.

FIG. 10 is a view similar to that of FIG. 1A of a portion of an article for application to flooring in accordance with the present invention.

FIG. 11 is an illustration of a plan view of the article of FIG. 10.

DETAILED DESCRIPTION OF THE PREFERRED EMBODIMENT(S)

Figure 1A:
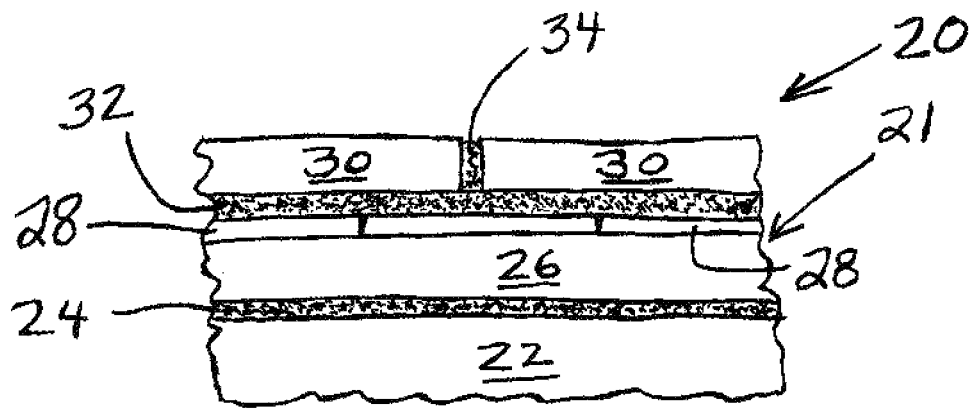
FIG. 1A is an illustration of an edge view of a portion of flooring which embodies the present invention, wherein the flooring substrate is wood and includes backer board.

Referring to FIG. 1A, there is shown generally at 20 a tiled floor which comprises a floor 21 which includes a wood floor substrate 22 to which has been bonded by the use of the aforesaid conventional latex-modified thinset mortar, illustrated at 24, a plurality (one shown) of strengthening backer boards 26. As appropriate, the backer boards 26 may also be otherwise suitably attached such as by screws, nails, or other fasteners. The backer boards 26 may, for example, be DensShield gypsum boards marketed by Georgia-Pacific Gypsum LLC of Atlanta, Ga., having a thickness of, for example, ¼ inch. It should be understood that, alternatively, the floor 21 may be a concrete floor substrate (as discussed hereinafter with respect to FIG. 1B), or it may be a sufficiently rigid hardwood floor or other sufficiently rigid wood substrate which does not include the backer boards. For example, the floor 21 may include a substrate of ⅝ inch douglas fir plywood to the upper surface of which is screwed or otherwise suitably attached ⅝ inch plywood.

In accordance with the present invention, laid on top of the backer boards 26 are suitable sheets in rolls or tiles or other forms such as, for example, vinyl tiles 28, pvc (polyvinylchloride) sheets, vinyl composition rubber sheets, fiberglass sheets, or a sheet which is a combination of fibrous felt and pvc or vinyl tiles, which are unattached to the backer boards 26. Thus, the sheets or vinyl tiles 28 are laid so as to "float" on the floor substrate 26, i.e., they are laid unattached to the floor substrate 26, whereby the thereafter laid ceramic tiles, as hereinafter described, can be easily and quickly removed for replacement by lifting the vinyl tiles 28, with the ceramic tiles attached, from the floor 21. The vinyl tiles 28 may, for example, be ⅛ inch vinyl composition 12 inch×12 inch tiles marketed by Olympia Tile of Toronto, Canada. Thinner vinyl tiles 28, which may be less expensive, may be used. For example, for application to a concrete floor 21, the vinyl tiles may be about 1/16 inch thick or even less. Although laid loosely, the vinyl tiles 28 should be laid tightly together so that they are not able to move around.

The ceramic tiles 30 are laid onto the floating vinyl tiles 28 and bonded thereto by the aforesaid latex-modified thinset mortar 32, and grouting, illustrated at 34, applied between the ceramic tiles 30. The grouting 34 is preferably a flexible grouting as described hereafter. The ceramic tiles 30 may, for example, be 16 inch square porcelain tiles. The tiles 30 are desirably porcelain (as opposed to other ceramic tiles) because porcelain tiles are more dense and stronger than the typical other ceramic tiles. The latex-modified thinset mortar 32 may, for example, be #52 polymer modified thinset mortar marketed by Olympia Tile of Toronto, Canada.

In order to install the backer boards 26, with the temperature at 65 degrees F. or greater, the backer boards 26, if used, or otherwise the surface of the floor substrate should be clean and free of any protrusions, bumps, or particles that may prevent the vinyl tiles 28 from lying flat, and the backer boards 26, if used, are suitably bonded with the thinset mortar 24 to the substrate 22. It is recommended that the seams of the backer boards 26 be patched with a thinset and latex add mix (latex-modified thinset mortar) that is intended to bond tile to vinyl, such as Mapei's Kerabond or Keralastic mortar, marketed by Mapei of Liverpool, N.Y., and the patch fan-dried for a minimum of 60 minutes.

In order to install the tiled floor 20, the vinyl tiles 28 are laid closely adjacent to each other with no glue or other bonding agent holding them to the surfaces of the backer boards 26 (or floor substrate, if no backer boards are used), whereby the vinyl tiles 28 "float" on the backer boards or substrate. A heat gun may be used to form the vinyl tiles 28 to the backer boards 26 (or floor substrate) in areas that are slightly uneven. Masking tape is applied to hold the vinyl tiles 28 together so they do not separate and create gaps. A suitable double-faced tape or releasable adhesive is applied underneath the vinyl tiles 28 along the edges of the floor to also prevent shifting and separation. A ¼ inch to ½ inch gap should be left around all edges of the floor to allow the room to expand and contract without causing the tile to buckle, and this gap should accordingly not be filled with thinset mortar or grout. The ceramic tiles 30 are then laid and bonded to the vinyl tiles 28 with the latex-modified thinset mortar 32 and then suitably grouted after they have properly set up.

Figure 1B:
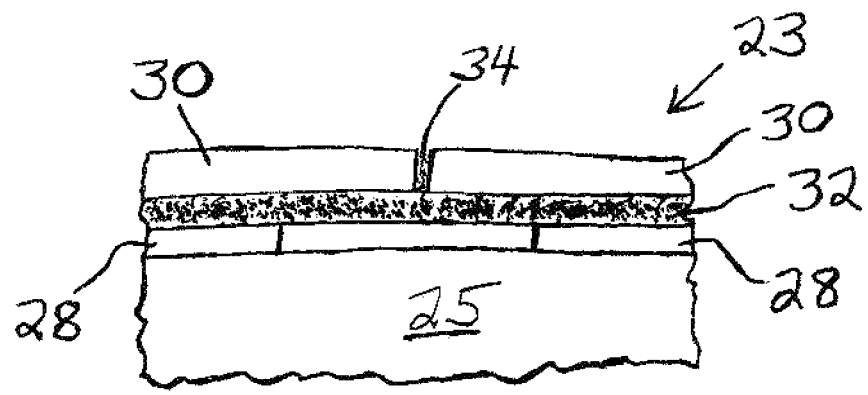
FIG. 1B is a view similar to that of FIG. 1A of the flooring portion, wherein the flooring substrate is concrete and does not include backer board.

Referring to FIG. 1B, there is illustrated generally at 23 a loosely laid ceramic floor in accordance with an alternative embodiment wherein the vinyl tiles 28 are laid loosely preferably over a concrete floor substrate 25 wherein the concrete is believed to have a rigidity to inhibit the development of tile cracking. The substrate 25 may alternatively be another suitably rigid substrate such as, for example, sufficiently rigid hardwood, not requiring the use of backer board. Preferably, in order to provide the desired rigidity, the hardwood is at least 1 inch thick, more preferably at least 1¼ inch thick.

A ceramic tiled floor similar to tiled floor 23 (i.e., over a concrete substrate) and using conventional grouting 34 has been installed experimentally in my tile store showroom for over 11 years, without my imparting to my customers the nature thereof, as a means of testing how long such a floor would hold up under normal use subjected to light foot traffic. To outward appearances, the floor has had the appearance of normal ceramic tile which is usually permanently bonded to the floor and has held up without appreciable cracking of the ceramic tile. It is therefore believed that my customers and the public did not ever become aware of the experimental nature of the floor.

In order to provide a flexible grouting between the ceramic tiles to further insure against cracking of the ceramic tiles, the grouting 34 (for both concrete and wood substrates) is preferably of a type disclosed in the aforesaid U.S. Pat. No. 7,183,338 which is incorporated herein by reference and which includes polyurethane to provide the flexibility to cushion the ceramic tiles against cracking from shifting and shock loads received by the floor.

While the floor 23 (using a conventional grouting and not the grouting disclosed in the aforesaid U.S. Pat. No. 7,183, 338) has successfully withstood the light floor traffic on the concrete showroom floor with no cracks in the ceramic tile, a floor similar to floor 20 (i.e., over a wood and backer board substrate and also using a conventional grouting and not the grouting disclosed in the aforesaid U.S. Pat. No. 7,183,338) did develop cracks when tested by the Tile Council of America. It is believed that, because the test was conducted on top of backer board that was bonded to a wood floor substrate that generally always shows deflection, movement of the wood floor substrate 22 supporting the backer boards 26 (which may have caused movement of the loosely laid vinyl tiles underneath the ceramic tiles) may have contributed to the cracking of the ceramic tile. Thus, for heavier foot traffic on wood substrate floors, there may still exist a need for an improved method and articles for laying an easy to install and remove durable ceramic tile floor, and such improvements will hereinafter be discussed.

Figure 2:
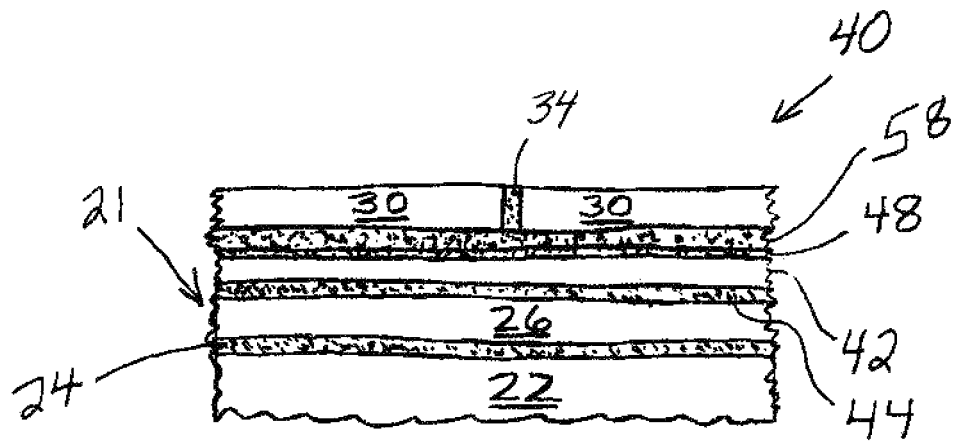
FIG. 2 is a view similar to that of FIG. 1A of a portion of flooring in accordance with an alternative embodiment of the present invention, wherein the flooring substrate includes backer board.

Referring to FIG. 2, there is shown generally at 40 a tiled floor for withstanding heavier foot traffic. The floor substrate 21 includes a wood floor 22 to which backer boards 26 have been suitably bonded with the aforesaid latex-modified thin-set mortar 24 and/or otherwise suitably attached similarly as described for the floor of FIG. 1A. In order to achieve the desired stability underneath the ceramic tiles, sheets 42 (discussed hereinafter) are suitably bonded to the backer boards 26 with a suitable adhesive 44 (discussed hereinafter), and the ceramic tiles 30 are suitably bonded to the sheets 42 as hereinafter described and suitably grouted as illustrated at 34.

Figure 3:
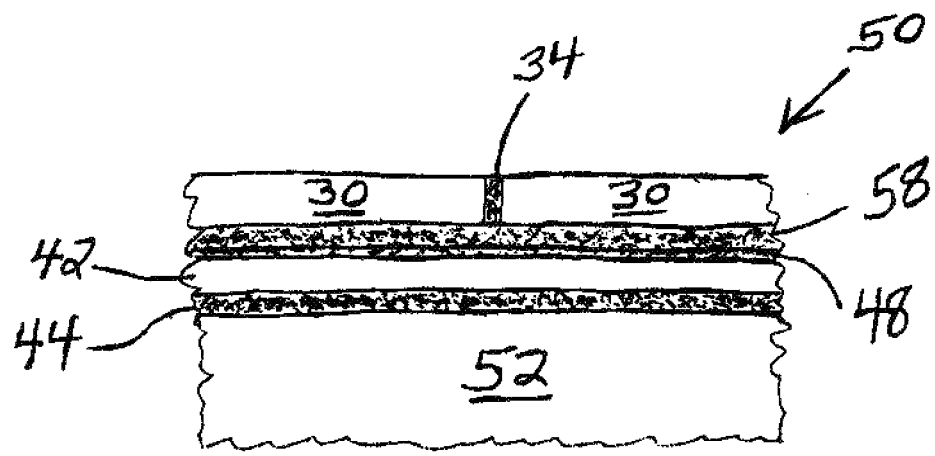
FIG. 3 is a view similar to that of FIG. 1A of a portion of flooring in accordance with the alternative embodiment of the present invention, wherein the flooring substrate is concrete and does not include backer board.

Referring to FIG. 3, there is shown generally at 50 a tiled floor wherein the floor substrate 52 is concrete or other suitably rigid substrate not requiring backer boards for strengthening thereof. The sheets 42 are accordingly bonded with the adhesive 44 directly to the concrete floor substrate 52 to thereby provide the desired stability underneath the ceramic tiles. Otherwise, the tiled floor 50 is similar to the tiled floor 40.

In order to allow easy and quick removal of the ceramic tiles 30, the sheet 42 is composed of paper or other suitable material which, while affording the desired stability under normal conditions of floor use, can tear apart or separate thus allowing the "peeling" of the ceramic tiles 30 from the floor substrate when it is desired to remove the ceramic tiles 30. The sheet 42 may, if desired, be pre-perforated or perforated (slitted) at the time of application at spaced locations (for example, every 9 to 12 inches) to allow accelerated curing time and/or easier removal of the tile 30.

Figure 6:
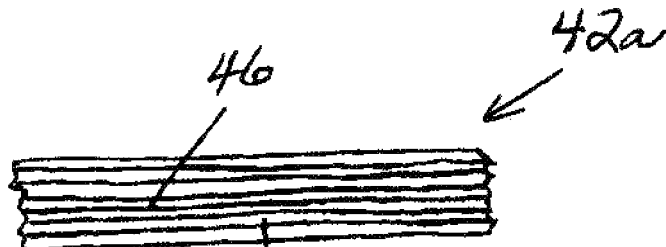
FIG. 6 is a view similar to that of FIG. 1A of an enlarged view of a sheet for the article.

Referring to FIG. 6, a preferred sheet 42 is sheet 42a which comprises a plurality of layers 46 of paper bonded together so that the layers 46 will separate one from another for removal of the ceramic tiles 30 from the floor substrate. An example of a suitable sheet 42a is Fiberock floor protection paper, which is a 12-point quality paper board marketed by United States Gypsum Company (USG) of Chicago, Ill. This paper, which has 7 layers 46 and a thickness of about 1/32 inch or less and with water resistance integral in all layers, is made in a wet slurry process formed by heat and pressure using a conventional paper rolling process that bonds the layers together. This paper, which is sold in 3 feet by 167 feet rolls, has conventionally been used for taping to a brand new floor (tile or wood) to protect it from damage while a home is being sold. It has a white side and a brown side. The white side should desirably face downward and is bonded to the floor substrate with the adhesive 44, which may be a suitable permanent adhesive. The brown side should desirably face upward since it has been found to appear to better receive the thinset mortar. Alternatively, when applied to backer board, it may be desired that the brown side face downwardly so as to provide better adherence between the paper and the backer board when the paper and backer board are assembled together for sale as a unit, it being found that the brown side appears to provide better adherence. The bonding of the paper layers 46 is desirably weaker than the bonding of the sheet to the floor substrate and to the ceramic tiles 30. Accordingly, when the ceramic tiles 30 are removed, the paper 42a separates such that some layers 46 remain with the floor substrate and others of the layers 46 remain with the ceramic tiles 30. Advantageously, it is then only necessary to make minor repairs to the backer board, wood, or concrete substrate, patch, and sand slightly in order to prepare the substrate to accept new tile.

Figure 7:
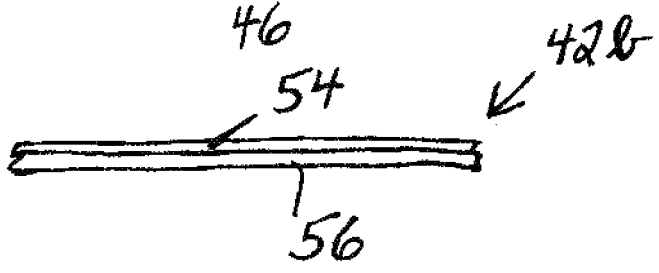
FIG. 7 is a view similar to that of FIG. 6 of an alternative embodiment of the sheet for the article.

Referring to FIG. 7, another suitable sheet 42 is a paper 42b (such as, for example, Polykraft paper) which is a coating 54 (about 0.0005 mil) of polyethylene film adhesively bonded (heat laminated) to a single layer 56 (or multiple layers) of suitable paper (for example, 50# Kraft paper, supplied by various suppliers including Chudy Paper of Buffalo, N.Y.). The Polykraft paper is believed to be water resistant. The sheet 42b may have a thickness of, for example, about 1/32 inch or less. Its polyethylene side 54 faces the ceramic tile 30 because polyethylene bonds well to thin-set mortar, and its paper side 56 is bonded to the floor substrate with the adhesive 44, which may be a suitable permanent adhesive. For easy removal of the ceramic tile 30, the adhesive laminating the polyethylene to the paper is desirably weaker than the bonding of the sheet 42 to the floor substrate and to the ceramic tiles 30, whereby the polyethylene coating may advantageously separate from the Kraft paper. Alternatively, the paper side 56 may face the ceramic tile 30, and the polyethylene side 54 may be bonded to the floor substrate with the adhesive 44, which may be a suitable releasable adhesive, whereby the sheet 42b may be advantageously peeled from the floor substrate. Either way, advantageously, it should then only be necessary to make minor repairs to the substrate, patch, and sand slightly in order to prepare the substrate to accept new tile. Polykraft paper is sold in widths of about 3 feet and lengths of about 600 feet.

Another suitable sheet 42 is the above discussed Polykraft paper and a releasable adhesive, such as Taylor's 2027 adhesive marketed by W. F. Taylor Co., Inc. of Dalton, Ga., is used to apply the paper to the substrate, whereby the laid ceramic tile 30 may be easily removed by peeling the paper from the substrate. The sheets of Polykraft paper should be laid into the adhesive with the shiny polyethylene side down.

Another suitable sheet 42 is the previously discussed 6 feet wide membrane known as an Underfloor membrane marketed by Congoleum of Mercerville, N.J. and which comprises a combination of fibrous felt and pvc (polyvinylchloride) vinyl. Another suitable sheet is the previously discussed 6 feet wide membrane known as a mul membrane ("mul" is also a fibrous felt and pvc vinyl combination) which is marketed by Mannington of Salem, N.J.

In order to lay the ceramic tiled floor, with the substrate surface clean and dry and the temperature at 65 degrees F. or greater, the sheet 42 is suitably adhesively applied to the floor substrate, using a permanent or releasable adhesive 44. For application of the aforesaid Polykraft paper, use a 1/32 inch by 1/32 inch square notch trowel to spread out the Taylor's 2027 adhesive, then use a fan to dry the adhesive (usually takes 20 to 30 minutes, the adhesive will change from a creamy color to a clear transparent state; if you touch it with your finger tips and it transfers to your fingers, it is not dry). Alternatively, NuSpray Lock spray adhesive, marketed by The Mohawk Group of Marietta, Ga., may be used. For application of sheets 42a and 42b, use a 1/16 inch square notch trowel to spread a multipurpose flooring adhesive such as Apac's #240, let the moisture wick off by letting the adhesive stand for about 10 minutes. After the respective adhesive is dry, roll out the respective sheet (42a or 42b or Polykraft) into the adhesive with the appropriate side (as previously discussed) up. Use a flat trowel to press the sheet into the adhesive while pressing out all air bubbles to the sides. Be sure edges of seams are flat, and do not let the seams of the sheets fall directly over any seams of the backer boards or other substrate seams. A knife may be used to puncture any air bubbles that won't come out. The sheets 42a and 42b should stand for about 10 minutes before setting tile, but the tile may be set immediately after the Polykraft paper has been set in place. A primer coat of suitable adhesive 48 may then be applied to the sheet 42 so that the sheet 42, if non-porous, may accept the bondant 58. If the sheet 42 is porous, then it may not be necessary to apply the primer adhesive 48. After the primer adhesive 48 has dried (or if no primer adhesive is applied due to the sheet 42 being sufficiently porous to accept the bondant 58), then the ceramic tiles 30 may be bonded to the sheet 42 by applying the bondant 58, which is desirably a thinset and latex add mix (latex modified thinset mortar) that is intended to bond tile to vinyl, such as the aforesaid Mapei's Kerabond or Keralastic mortar. The mortar should have suitable body or applied thickness to bond the ceramic tiles 30 in place. The ceramic tiles 30 are then suitably set into the mortar 58 suitably adjacent each other and allowed to set up, and, after waiting 48 hours, suitable grouting 34 is applied.

Figure 4:
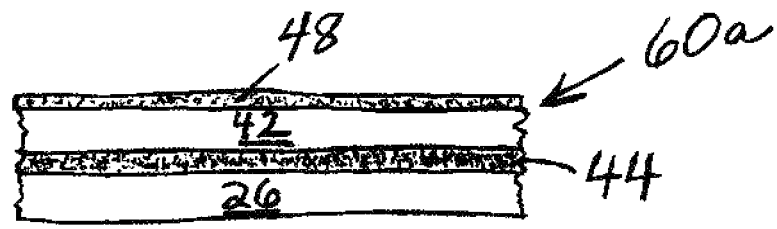
FIG. 4 is a view similar to that of FIG. 1A of a portion of an article for application to flooring in accordance with the present invention.
Figure 5:
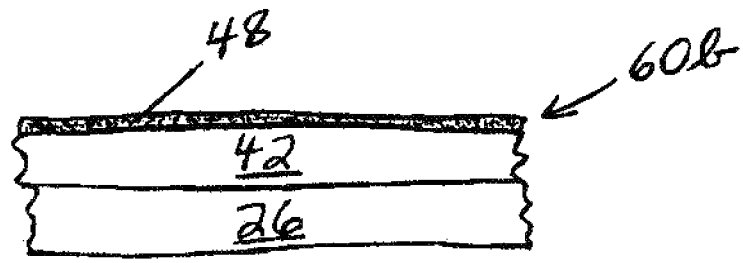
FIG. 5 is a view similar to that of FIG. 1A of a portion of an alternative embodiment of the article.

Referring to FIG. 4, in accordance with the present invention, in order to make the installation of the ceramic tiles 30 easier, an article, illustrated generally at 60a, may be provided to a consumer in which the sheet 42 has been pre-applied with the adhesive 44 to a backer board 26. Referring to FIG. 5, an alternative article 60b comprises the sheet 42 pre-applied to the backer board 26 by bonding them together in a slurry state wherein the adhesive is not used. If the sheet 42 is non-porous, the primer adhesive 48 may also be pre-applied thereto (but is not required); otherwise, the primer adhesive may not be necessary. In order to install the ceramic tiles 30, the customer may apply the backer board portion of the article 60 (either 60a or 60b) to the floor substrate 22 using the thinset mortar 24 similarly as previously discussed with respect to FIG. 2, then the ceramic tiles 30 may be applied to the sheet portion of the article 60 (either 60a or 60b) using the thinset mortar 58 and, if necessary, the primer adhesive 48, as also previously discussed. Thus, the customer is desirably spared the time-consuming step of applying the sheet 42 to the backer board 26 and may also be spared the time-consuming step of applying the primer adhesive.

Referring to FIG. 8, in accordance with an alternative embodiment tiled floor 70 of the present invention, an adhesive tape 72 is suitably applied to the backer board 26, and the ceramic tiles 30 are suitably bonded to the tape 72 using the thinset or other suitable mortar as previously discussed. Alternatively, as illustrated in FIG. 9, the adhesive tape 72 may be applied to a hardwood floor 74. As best seen in FIG. 10, the tape 72 includes a strip 76 of suitable material to which has been pre-applied a suitable adhesive 78. While the primer adhesive 48 may be pre-applied, it is preferred that the customer spray it on after the tape has been applied.

The tape strip 76 may be composed, for example, of polyethylene, which may have a thickness of, for example, 5 to 6 mils, or other suitable plastic material. Another suitable tape strip 76 is aluminum foil, which may have a thickness of, for example, 2 mils. The tape strip 76 may also be composed, for example, of rubber or synthetic rubber or other suitable material.

In order to not damage the hardwood floor 74 or other floor to which the adhesive tape 72 is applied and in order to allow easy and quick removal of the laid tiled floor, in accordance with the present invention, the adhesive 78 is a releasable or removable adhesive. Such adhesives are provided to form temporary bonds and, in preferred forms, can be removed after months or years without leaving other than perhaps a small amount of residue on the adherent. They are used in applications such as surface protection films, masking tapes, bookmark and note papers, price marking labels, promotional graphics materials, and skin contact (i.e, wound care dressings, EKG electrodes, athletic tape, etc.). Such adhesives have low adhesion and generally cannot support much weight, but they are considered to provide sufficient adhesion for providing the needed stability for the tiled floors of the present invention. Examples of releasable adhesives include the aforesaid Taylor's 2027 adhesive and Mannington's MT711 adhesive. The releasable adhesive 78 releases best from non-porous surfaces such as a urethane-finished wood or polyethylene-finished wood or other non-porous or high gloss hardwoods or substrate surfaces. Accordingly, a urethane or polyethylene or other high gloss finish should desirably be applied to a substrate before the tape 72 is applied thereto. As used herein and in the claims, a releasable adhesive is one which dis-adheres or releases from the adherent upon application of moderate or minimal peeling force to the tape and thus forms a non-permanent bond. In contrast, a contact or self-stick adhesive (which may or may not be releasable) may be of a type which forms a permanent or non-removable bond and should therefore not be considered to be a releasable adhesive.

Suitable adhesive aluminum foil tape 72 may, for example, be a 2-mil thick aluminum foil tape, marketed by Walco Corporation of Glenshaw, Pa., with acrylic adhesive having an adhesion strength to steel of about 40 ounces per inch so that the tape is releasable. Another suitable aluminum foil tape 72 may, for example, be aluminum foil tape #425 (ID #70-0063-8599-4) marketed by 3M corporation and having a suitable releasable adhesive and provided in widths up to 40 inches, and typically used for heat protection around duct work.

The adhesive tape 72 should desirably be wide enough to make application efficient but not so wide that it is unwieldy. In accordance with the present invention, the adhesive tape 72 has a width, illustrated at 81 in FIG. 11, which is between about 22 and 44 inches, for example, about 30 inches. While the length, illustrated at 82, is not critical, the length 82 may, for example, be about 80 feet.

In order to form the ceramic tiled floor 70 or 80 using the releasable adhesive tape 72, with the substrate surface clean and dry and with the temperature at 65 degrees F. or more, proceed to cover the substrate surface with the releasable adhesive tape 72, taking care not to let the seams of the tape fall directly over any backer board or wood seams, but it is OK to overlap the edges of the tape. Although it is OK to lift and reposition the tape in order to remove bubbles, it is suitable to just puncture a bubble with a knife, and it is unnecessary to remove very tiny air bubbles. Too much lifting and repositioning of the tape may jeopardize the bonding quality of the adhesive. Use a very slightly damp rag or sponge to wipe off any dust or dirt, and use a wire brush to scuff up the surface of the tape while pushing out most of the remaining air bubbles and pressing the tape into the substrate more securely. The tape may then be immediately sprayed with the primer adhesive 48 (optional) and the adhesive allowed to dry. Then apply the thinset mortar and lay the ceramic tile 30 in place. Although a latex modified thinset mortar can be used, it is recommended that the mortar be the aforesaid thinset and latex add mix that is intended to bond tile to vinyl, such as Kerabond mortar and Keralastic latex add mix marketed by Mapei of Liverpool, N.Y. It is recommended to then wait 48 hours before grouting.

Figure 12:
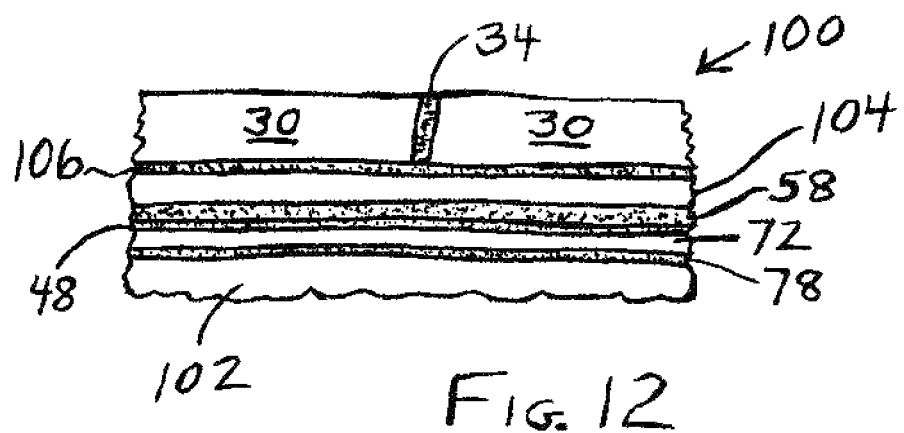
FIG. 12 is a view similar to that of FIG. 1A of a portion of flooring in accordance with the another embodiment of the present invention, wherein the flooring substrate is hardwood.

Referring to FIG. 12, there is illustrated generally at 100 flooring in which the ceramic tiles 30 are applied to a hardwood floor 102. A hardwood floor, if not already strong and rigid enough, may require the addition of a strengthening membrane in order to have sufficient strength or rigidity for the application of the ceramic tiles 30. Yet the use of nails for applying backer board to a hardwood floor would damage the hardwood. In order to prevent such damage, in accordance with the present invention, the tape 72 is releasably bonded directly to the hardwood floor 102, as previously discussed, and a suitable strengthening membrane 104 is suitably bonded to the tape 72 (to which the primer adhesive 48 is applied, if needed). A suitable membrane 104 may be Ditra matting marketed by Schluter Systems L.P. of Plattsburg, N.Y., and it may be bonded to the aluminum tape 72 with the thinset mortar 58, which may, for example, be #254 mortar provided by Laticrete International Inc. of Bethany, Conn. or may be the aforesaid Mapei Kerabond mortar with Keralastic latex add mix. The ceramic tiles 30 are then suitably bonded to the membrane 104 with bondant 106, which may, for example, be the Mapei Kerabond mortar with no add mix, and suitably grouted. In order to remove or replace the ceramic tiles 30 at a date months or years later, the tiles 30 along with the membrane 104 are stripped from the tape 72. The tape 72 is then removed without leaving other than perhaps a small amount of residue, which is then removed. Since no nails or screws or mortar is used during installation of the ceramic tiles 30, the hardwood floor 102 desirably need only be suitably sanded and refinished for use. If the hardwood floor is suitably strong and rigid enough, the ceramic tiles can of course be bonded directly to the aluminum foil.

Figure 13:
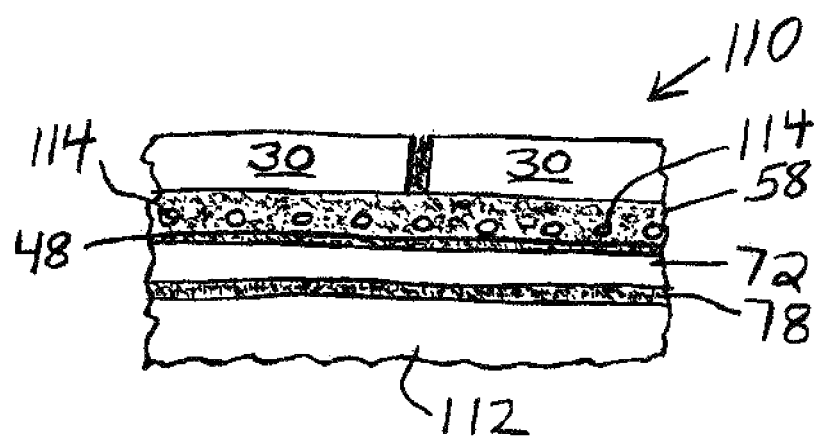
FIG. 13 is a view similar to that of FIG. 1A of a portion of flooring in accordance with the another embodiment of the present invention.

Referring to FIG. 13, there is illustrated generally at 110 heated flooring in which the ceramic tiles 30 are applied to any suitable floor substrate, illustrated generically at 112. An electric heating system illustrated by wires 114 but which may be in any other suitable form such as matting is provided to underlie the ceramic tiles 30 for heating thereof. In order to increase the efficiency of the heating system 114, in accordance with the present invention, the aluminum foil tape 72 is applied to the floor substrate 112 to underlie the heating system 114 so that the heat reflective qualities of the aluminum foil tape can prevent or reduce heat loss by preventing or reducing heat from being absorbed into the substrate 112. While the heating system 114 is illustrated within the thinset mortar 58 (which may be latex-modified), it should be understood that it may otherwise be suitably installed within the ceramic tile flooring 110. While the tape 72 for this purpose is described as aluminum tape, it should also be understood that it may be any other suitable tape having the desired heat reflective qualities and may be suitably applied to the substrate 112 otherwise than by the releasable adhesive 78.

Figure 14:
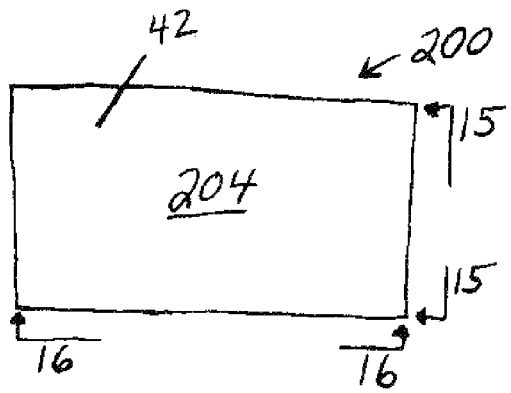
FIG. 14 is a plan view of an alternative embodiment of an article for application to flooring.
Figure 15:
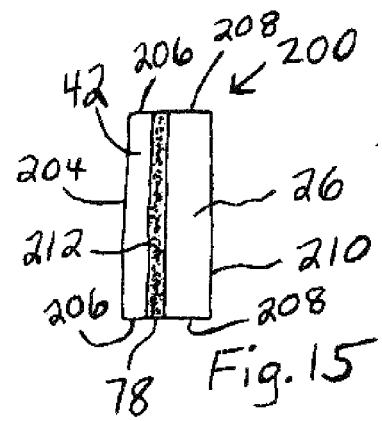
FIG. 15 is an edge view of the article of FIG. 14 taken along lines 15-15 thereof.
Figure 16:
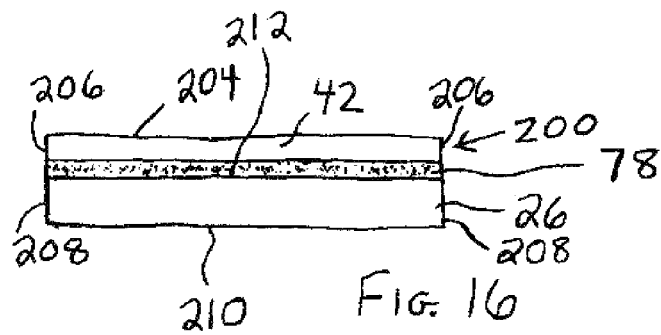
FIG. 16 is an edge view of the article of FIG. 14 taken along lines 16-16 thereof.
Figure 17:
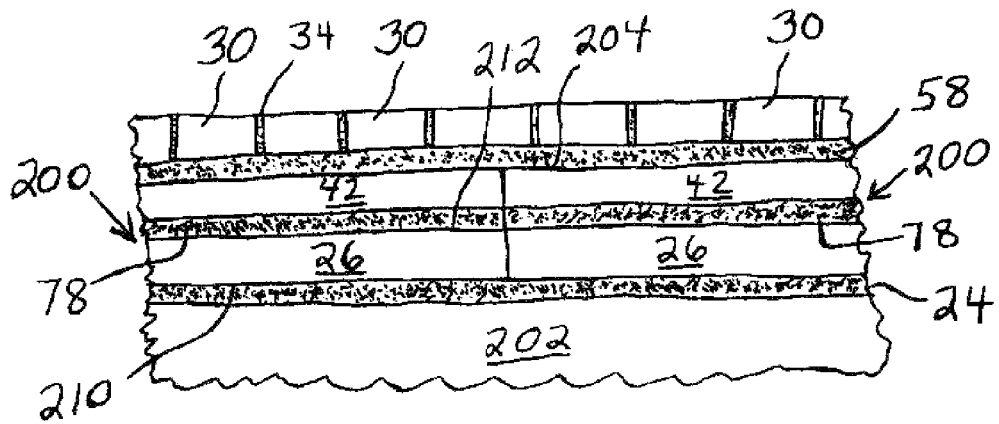
FIG. 17 is an edge view of a portion of flooring with a pair of the articles of FIGS. 14 to 16 applied thereto and with tiles applied thereto.

Referring to FIGS. 14 to 16, there is illustrated generally at 200 a pre-fabricated article in accordance with another embodiment for application to a wood floor substrate or other suitable floor substrate, illustrated at 202 in FIG. 17, to provide a surface 204 upon which the ceramic tiles 30 may be laid for later easy removability thereof when it is desired to replace the tiles.

The article 200 includes a backer board 26 which has a lower surface 210 for attachment to the floor substrate 202 and an upper surface 212 to which is adhesively attached a sheet 42 by means of a releasable adhesive 78. The article 200 is pre-fabricated for sale to, for example, a floor installer or homeowner so as to ease and simplify the installation of the ceramic tiles particularly to a wood floor on-site.

The installation process involves applying the backer boards 26 edge-to-edge to the existing floor substrate 202 such as by use of the thinset mortar 24 or otherwise as is suitable. The thin-set mortar 58 (or other suitable bondant) is applied to sheets 42 and the ceramic tiles 30 applied edge-to-edge with suitable grouting 34 there between as previously discussed to bond the tiles 30 to the sheets 42. As illustrated in FIG. 17, the tiles 30 may be laid to overlap edges of the backer boards 42.

The sheet 42 preferably comprises the previously discussed Polykraft paper, and the releasable adhesive 78 should desirably releasably bond its polyethylene non-porous side to the backer board 26 so as to allow its easier removal.

The sheet 42 and releasable adhesive 78 may alternatively comprise the aforesaid adhesive tape 72 including the strip 76 with the releasable adhesive 78 pre-applied or applied during the manufacturing process of the article 200.

It is important that little or none of the bondant 58, which is not releasable, come into contact with the backer boards 26 since the bondant 58 in contact with the backer boards, if more than minimal contact, would make removal of the tiles 30 and sheets 42 difficult and may require repair to the backer boards. In order to avoid such contact, in accordance with the present invention, the sheet 42 covers the entirety of the upper surface 212 of the backer board 26, as illustrated in FIGS. 14 to 17. Thus, the edges 206 of the sheet 42 extend out to and are co-extensive with the respective edges 208 of the backer board 26 on all sides, whereby when the articles 200 are laid edge-to-edge, as illustrated in FIG. 17, there is virtually no space for the bondant 58 to penetrate beyond the sheet 42 to come into contact with the backer board 26. However, it should be understood that the respective edges need not be perfectly aligned and that there could be de minimus or insignificant gaps between respective edges or otherwise (distance which an edge 208 overlaps a corresponding edge 206 or even a void or slit in the sheet 42) which could allow only an insignificant penetration of the bondant 58 to the backer board 26, necessitating only insignificant repair, if any, of the backer board 26. For example, a gap up to about ½ inch between respective edges 206 and 208 would be considered insignificant. For the purposes of this specification and the claims, the term "entirety" is defined so that the sheet 42 still covers the entirety of the upper surface 212 of the backer board 26 even though there is one or more such gaps which are in total de minimus and do not significantly affect the quality of the article 200.

When it is desired to replace the ceramic tiles 30, they and the sheet 42 may be easily "peeled" from the backer boards 26 which should then be in condition for applying new ceramic tiles in accordance with the discussion herein. For example, the adhesive tape 72 may be applied followed by bonding of the new tiles thereto as previously discussed. If desired, it is perceived that new articles 200 may be suitably applied to the old backer boards 26.

It should be understood that, while the present invention has been described in detail herein, the invention can be embodied otherwise without departing from the principles thereof, and such other embodiments are meant to come within the scope of the present invention as defined by the appended claims.

What is claimed is:

1. A method of laying ceramic tiles comprising the steps of (a) bonding to a floor substrate at least one article of manufacture comprising a backer board having upper and lower surfaces, a sheet composed of at least one layer of plastic, and a releasable adhesive bonding the sheet to the upper surface of the backer board, wherein the step of bonding the article to the floor substrate includes bonding the lower surface of the backer board to the floor substrate, and (b) bonding at least one ceramic tile to the sheet, wherein the step of bonding the ceramic tile to the sheet includes applying a mortar to the sheet and laying the ceramic tile in the mortar.

2. A method according to claim 1 wherein the step of bonding the ceramic tile to the sheet further includes applying a primer adhesive to the sheet before applying the mortar to the sheet.

3. A method according to claim 1 wherein the sheet covers the entirety of the upper surface of the backer board.

4. A method according to claim 1 wherein the sheet and the releasable adhesive comprise adhesive tape.

5. A method according to claim 1 wherein the sheet comprises paper with the plastic layer adhesively attached to the paper.

6. A method according to claim 1 wherein the sheet comprises paper with said plastic layer adhesively attached to the paper, wherein the plastic layer is a polyethylene layer.

7. A method according to claim 1 wherein the step of applying a mortar to the sheet and laying the ceramic tile in the mortar comprises applying a thinset mortar to the sheet and laying the ceramic tile in the thinset mortar.

8. In combination with a floor substrate, at least one backer board having a lower surface bonded to the floor substrate and an upper surface, at least one sheet, a releasable adhesive bonding said sheet to said upper surface of said backer board, at least one ceramic tile, and mortar bonding said tile to said sheet, whereby said at least one ceramic tile is removable by peeling said sheet from said backer board, and wherein said sheet is composed of at least one layer of plastic.

9. A combination according to claim 8 wherein said backer board, said sheet, and said releasable adhesive comprise a pre-fabricated article of manufacture for attachment to the floor substrate.

10. A combination according to claim 8 wherein said sheet covers the entirety of said upper surface of said backer board.

11. A combination according to claim 8 wherein said sheet and said releasable adhesive comprise adhesive tape.

12. An article for applying to a floor substrate for preparing the floor substrate for laying of ceramic tiles by bonding ceramic tiles to the article, the article comprising a backer board having a lower surface for application to a floor substrate and an upper surface, a sheet, and a releasable adhesive bonding said sheet to said upper surface of said backer board so that ceramic tiles may thereafter be bonded to said sheet, wherein said sheet covers the entirety of said upper surface of said backer board, and wherein said sheet is composed of at least one layer of plastic.

13. An article according to claim 12 wherein said sheet and said releasable adhesive comprise adhesive tape.

14. An article according to claim 12 wherein said sheet comprises paper and with said plastic layer adhesively attached to said paper.

15. An article according to claim 12 wherein said sheet comprises paper with said plastic layer adhesively attached to said paper, wherein said plastic layer is a polyethylene layer.

* * * * *